(12) United States Patent
Kim et al.

(10) Patent No.: US 12,556,333 B2
(45) Date of Patent: Feb. 17, 2026

(54) METHOD AND DEVICE FOR REDUCING OVERHEAD OF POSITIONING REFERENCE SIGNAL TRANSMISSION

(71) Applicant: IUCF-HYU (INDUSTRY-UNIVERSITY COOPERATION FOUNDATION HANYANG UNIVERSITY), Seoul (KR)

(72) Inventors: Sun Woo Kim, Seoul (KR); Jeongwan Kang, Seoul (KR); Taekyoon Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 391 days.

(21) Appl. No.: 18/041,693

(22) PCT Filed: Sep. 3, 2021

(86) PCT No.: PCT/KR2021/011966
§ 371 (c)(1),
(2) Date: Feb. 14, 2023

(87) PCT Pub. No.: WO2022/050775
PCT Pub. Date: Mar. 10, 2022

(65) Prior Publication Data
US 2023/0370228 A1    Nov. 16, 2023

(30) Foreign Application Priority Data
Sep. 3, 2020 (KR) .................. 10-2020-0112354

(51) Int. Cl.
*H04L 5/00* (2006.01)
*H04W 72/044* (2023.01)

(52) U.S. Cl.
CPC ......... *H04L 5/0051* (2013.01); *H04W 72/046* (2013.01)

(58) Field of Classification Search
CPC ... H04L 5/0007; H04L 5/0023; H04L 5/0028; H04L 5/0048; H04L 5/005; H04L 5/0051;
(Continued)

(56) References Cited

U.S. PATENT DOCUMENTS 11,076,266 B2 * 7/2021 Kim .................. H04L 27/26025
11,096,187 B2 * 8/2021 He ........................ H04L 5/0023
(Continued)

FOREIGN PATENT DOCUMENTS

KR    10-2020-0050901 A    5/2020

OTHER PUBLICATIONS

International Search Report and Written Opinion of the Internal Search Authority issued in PCT Application No. PCT/KR2021/011966. Dated Dec. 16, 2021.
(Continued)

*Primary Examiner* — Frank Duong

(57) ABSTRACT

The present embodiments relate to a method and a device for reducing an overhead of positioning reference signal transmission, the method comprising the steps of: receiving configuration information for a positioning reference signal from a base station; receiving, from the base station, a plurality of wide beams through which the positioning reference signal is transmitted, on the basis of the configuration information; reporting information on an optimal wide beam determined from among the plurality of wide beams to the base station; and receiving, from the base station, a plurality of narrow beams through which the
(Continued)

positioning reference signal is transmitted, on the basis of the optimal wide beam.

12 Claims, 16 Drawing Sheets

(58) Field of Classification Search
 CPC .... H04L 5/0053; H04W 24/10; H04W 64/00; H04W 64/003; H04W 72/23; H04W 72/51; H04W 72/54; H04W 74/006; H04W 72/046
 See application file for complete search history.

(56) References Cited

U.S. PATENT DOCUMENTS

| | | | | |
|---|---|---|---|---|
| 11,122,455 B2* | 9/2021 | Lee | .................... | H04L 43/0811 |
| 11,178,551 B2* | 11/2021 | Kim | .................... | H04W 64/003 |
| 11,233,612 B2* | 1/2022 | Ly | .................... | H04L 5/0048 |
| 11,979,883 B2* | 5/2024 | Khoryaev | ............. | H04W 72/51 |
| 12,021,775 B2* | 6/2024 | Huang | .................. | H04W 24/04 |
| 2021/0306895 A1* | 9/2021 | Chen | .................... | G01S 5/0236 |
| 2021/0373118 A1* | 12/2021 | Bao | ........................ | G01S 5/0236 |

OTHER PUBLICATIONS

CMCC, 'Discussion on necessity of physical-layer procedure to support UE/gNB measurements', R1-1904741, 3GPP TSG-RAN WG1 #96b, Xi'an, China, Mar. 30, 2019.
Ericsson, 'DL reference signals for NR positioning', R1-1911228, 3GPP TSG-RAN WG1 #98b, Chongqing, China, Oct. 4, 2019.
Sony, 'Potential Techniques for NR Positioning Enhancements', R1-2004192, 3GPP TSG-RAN WG1 #1 01, e-Meeting, May 16, 2020.
Qualcomm Incorporated, 'DL Reference Signals for NR Positioning', R1-1911132, 3GPP TSGRAN WG1 #98, Chongqing, China, Oct. 5, 2019.

* cited by examiner

METHOD AND DEVICE FOR REDUCING OVERHEAD OF POSITIONING REFERENCE SIGNAL TRANSMISSION

CROSS-REFERENCE TO RELATED APPLICATIONS

This application is a National Stage Entry of PCT International Application No. PCT/KR2021/011966, which was filed on Sep. 3, 2021, and which claims priority from and the benefit of Korean Patent Application No. 10-2020-0112354, filed with the Korean Intellectual Property Office on Sep. 3, 2020, all of which are hereby incorporated by reference for all purposes as if fully set forth herein. In addition, when this application also claims priority for countries other than the United States for the same reason as above, all of the contents of the above-listed applications are hereby incorporated by reference.

TECHNICAL FIELD

The present embodiments propose a method and device for reducing the overhead of positioning reference signal transmission in a next-generation radio access network (hereinafter, "new radio (NR)").

BACKGROUND ART

The 3GPP has recently authorized "Study on New Radio Access Technology" which is a research item for next-generation radio access technology (in other words, 5G radio access technology) and, based thereupon, RAN WG1 is conducting a design for, e.g., the frame structure of new radio (NR), channel coding, channel coding & modulation, and waveform & multiple access scheme. NR requires a design for meeting various QoS requirements required for each of usage scenarios more broken down and specified and enhanced data rate as compared with LTE.

As representative usage scenarios of NR, enhancement mobile broadband (eMBB), massive machine type communication (mMTC), and ultra-reliable and low latency communications (URLLC) have been defined and, to meet the requirements for each usage scenario, a flexible frame structure as compared with LTE needs to be designed.

Each usage scenario has different requirements for data rates, latency, reliability, and coverage. Thus, a need arises for a scheme of efficiently multiplexing radio resource units based on different numerologies (e.g., subcarrier spacing, subframe, transmission time interval (TTI), etc.) as a method for efficiently meeting the requirements for each usage scenario via the frequency band constituting any NR system.

Meanwhile, in relation to positioning for positioning a UE, when a positioning reference signal (PRS) is transmitted using a beam, transmission should be performed with a narrower beam to enhance the accuracy of transmission. This requires more resources, causing an overhead issue.

Further, under development is technology for performing communication using a high frequency range (frequency range 2 (FR2)). However, use of a high frequency band requires multiple array antennas and a wide frequency band, which may result in an overhead issue. In other words, periodic transmission signals, such as positioning reference signals, may cause high frequency overhead, and thus, a more efficient design thereof is needed.

DETAILED DESCRIPTION OF THE INVENTION

Technical Problem

Embodiments of the disclosure may provide a method and device for reducing the overhead of positioning reference signal transmission that may transmit a positioning reference signal through beam sweeping performed in two steps.

Technical Solution

In an aspect, the present embodiments may provide a method for reducing overhead of positioning reference signal (PRS) transmission by a user equipment (UE), comprising receiving configuration information for a positioning reference signal from a base station, receiving a plurality of wide beams where the positioning reference signal is transmitted from the base station, based on the configuration information, reporting information about an optimal wide beam determined among the plurality of wide beams to the base station, and receiving a plurality of narrow beams where the positioning reference signal is transmitted from the base station, based on the optimal wide beam.

In another aspect, the present embodiments may provide a method for reducing overhead of positioning reference signal (PRS) transmission by a base station, comprising transmitting configuration information for a positioning reference signal to a UE, transmitting a plurality of wide beams where the positioning reference signal is transmitted to the UE, based on the configuration information, receiving information about an optimal wide beam determined among the plurality of wide beams from the UE and transmitting a plurality of narrow beams where the positioning reference signal is transmitted to the UE, based on the optimal wide beam.

In another aspect, the present embodiments may provide a UE for reducing overhead of positioning reference signal (PRS) transmission, comprising a transmitter, a receiver and a controller controlling the transmitter and the receiver, wherein the controller receives configuration information for a positioning reference signal from a base station, receives a plurality of wide beams where the positioning reference signal is transmitted from the base station, based on the configuration information, reports information about an optimal wide beam determined among the plurality of wide beams to the base station, and receives a plurality of narrow beams where the positioning reference signal is transmitted from the base station, based on the optimal wide beam.

In another aspect, the present embodiments may provide a base station for reducing overhead of positioning reference signal (PRS) transmission, comprising a transmitter, a receiver, and a controller controlling the transmitter and the receiver, wherein the controller transmits configuration information for a positioning reference signal to a UE, transmits a plurality of wide beams where the positioning reference signal is transmitted to the UE, based on the configuration information, receives information about an optimal wide beam determined among the plurality of wide beams from the UE, and transmits a plurality of narrow beams where the positioning reference signal is transmitted to the UE, based on the optimal wide beam.

Advantageous Effects

According to the present embodiments, there may be provided a method and device for reducing the overhead of positioning reference signal transmission capable of addressing overhead issues that may be caused upon transmitting a positioning reference signal in a high frequency band or enhancing accuracy by transmitting a positioning reference signal through beam sweeping performed in two steps.

MODE FOR CARRYING OUT THE INVENTION

Figure 1:
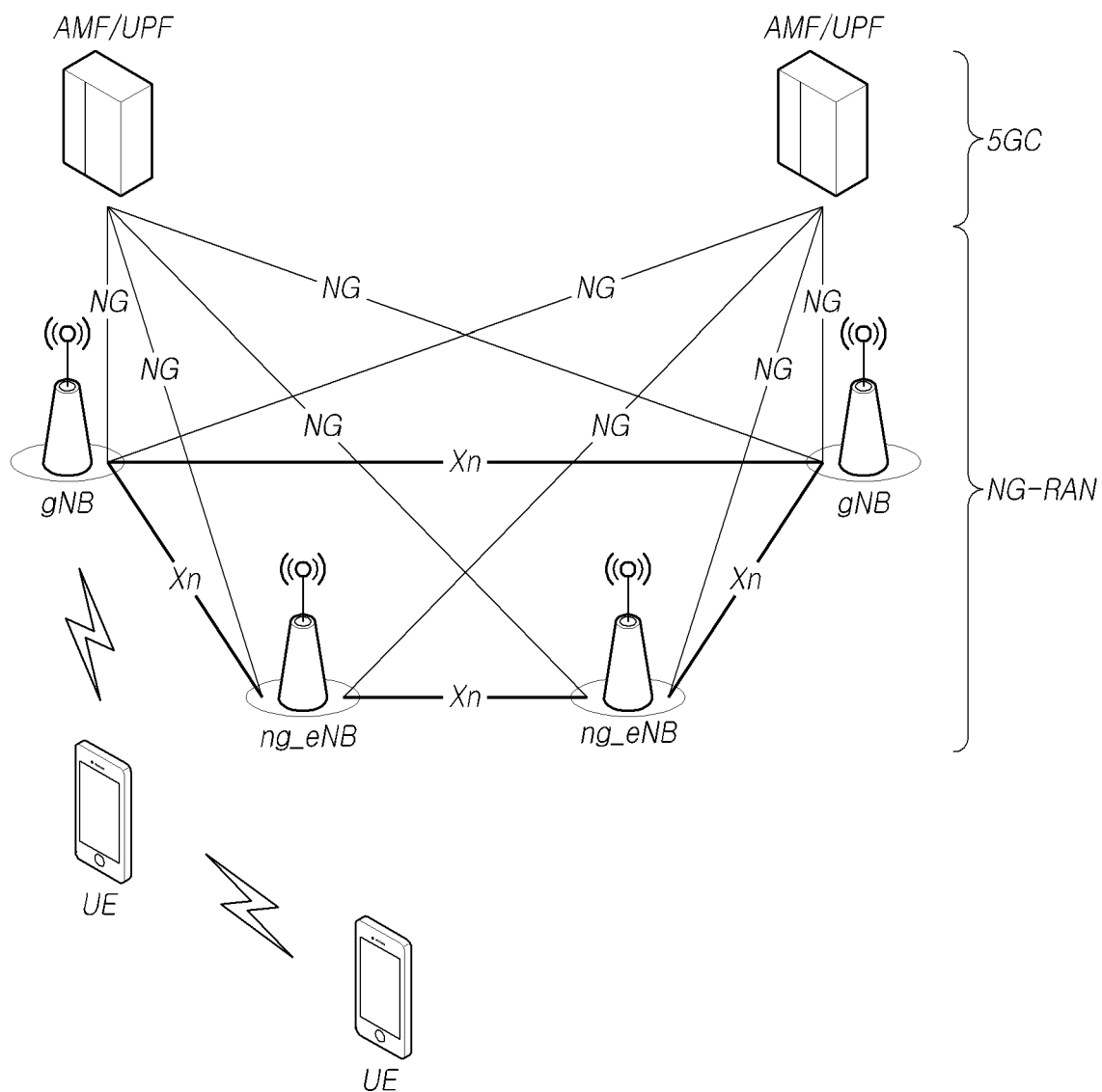
FIG. 1 is a view schematically illustrating a structure for an NR wireless communication system to which the present embodiments may apply.

Hereinafter, embodiments of the disclosure are described in detail with reference to the accompanying drawings. The same or substantially the same reference denotations are used to refer to the same or substantially the same elements throughout the specification and the drawings. When determined to make the subject matter of the present invention unclear, the detailed of the known art or functions may be skipped. The terms "comprises" and/or "comprising," "has" and/or "having," or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof. As used herein, the singular forms "a", "an" and "the" are intended to include the plural forms as well, unless the context clearly indicates otherwise.

Such denotations as "first," "second," "A," "B," "(a)," and "(b)," may be used in describing the components of the present invention. These denotations are provided merely to distinguish a component from another, and the essence of the components is not limited by the denotations in light of order or sequence.

In describing the positional relationship between components, when two or more components are described as "connected", "coupled" or "linked", the two or more components may be directly "connected", "coupled" or "linked ", or another component may intervene. Here, the other component may be included in one or more of the two or more components that are "connected", "coupled" or "linked" to each other.

In relation to components, operational methods or manufacturing methods, when A is referred to as being "after," "subsequent to," "next," and "before," A and B may be discontinuous from each other unless mentioned with the term "immediately" or "directly."

When a component is designated with a value or its corresponding information (e.g., level), the value or the corresponding information may be interpreted as including a tolerance that may arise due to various factors (e.g., process factors, internal or external impacts, or noise).

In the disclosure, 'wireless communication system' means a system for providing various communication services, such as voice and data packets, using a radio resource and may include a UE, a base station, or a core network.

The present embodiments disclosed below may be applied to wireless communication systems using various radio access technologies. For example, the present embodiments may be applied to various radio access technologies, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). Further, radio access technology may mean not only a specific access technology, but also a communication technology for each generation established by various communication organizations, such as 3GPP, 3GPP2, Wi-Fi, Bluetooth, IEEE, and ITU. For example, CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented with a wireless technology, such as institute of electrical and electronic engineers (IEEE) 802.11 (Wi-Fi), IEEE 802.16 (WiMAX), IEEE 802-20, evolved UTRA (E-UTRA), and the like. IEEE 802.16m is an evolution of IEEE 802.16e, and provides backward compatibility with IEEE 802.16e-based systems. UTRA is part of UMTS (universal mobile telecommunications system). 3GPP (3rd generation partnership project) LTE (long term evolution) is part of E-UMTS (evolved UMTS) using evolved-UMTS terrestrial radio access (E-UTRA) and adopts OFDMA for downlink and SC-FDMA for uplink. As such, the present embodiments may be applied to currently disclosed or commercialized radio access technologies and may also be applied to radio access technologies currently under development or to be developed in the future.

Meanwhile, in the disclosure, 'UE' is a comprehensive concept meaning a device including a wireless communication module that communicates with a base station in a wireless communication system and should be interpreted as a concept that may include not only user equipment (UE) in, e.g., WCDMA, LTE, NR, HSPA, and IMT-2020 (5G or new radio), but also a mobile station (MS), user terminal (UT), subscriber station (SS), or wireless device in GSM. Further, the UE may be a user portable device, such as a smartphone, according to the usage type and, in the V2X communication system, the UE may mean a vehicle or a device including a wireless communication module in the vehicle. Further, in the case of a machine type communication system, the UE may mean an MTC terminal, M2M terminal, or URLLC terminal equipped with a communication module to perform machine type communication.

In the disclosure, 'base station' or 'cell' refers to a terminal that communicates with a UE in terms of a network and in concept encompasses various coverage areas, such as node-B, evolved node-B (eNB), gNode-B (gNB), low power node (LPN), sector, site, various types of antennas, base transceiver system (BTS), access point, point (e.g. transmission point, reception point, or transmission/reception point), relay node, mega cell, macro cell, micro cell, pico cell, femto cell, remote radio head (RRH), radio unit (RU), or small cell. Further, 'cell' may mean one including a bandwidth part (BWP) in the frequency domain. For example, 'serving cell' may mean the activation BWP of the UE.

Since there is a base station controlling one or more cells in the various cells enumerated above, the base station may be interpreted in two meanings. The base station may be 1) a device itself which provides a mega cell, a macro cell, a micro cell, a pico cell, a femto cell, or a small cell in relation to the radio region, or 2) the radio region itself. In 1), all devices that provide a predetermined radio region and are controlled by the same entity or interact to configure a radio region via cooperation are denoted as base stations. An embodiment of the base station is a transmission/reception point, transmission point, or reception point depending on the scheme of configuring the radio region. In 2), the radio region itself, in which a signal is received or transmitted from the point of view of the UE or a neighboring base station may be the base station.

In the disclosure, 'cell' may mean the coverage of the signal transmitted from the transmission/reception point, a component carrier having the coverage of the signal transmitted from the transmission/reception point (transmission point or transmission/reception point), or the transmission/reception point itself.

Uplink (UL) means a scheme for transmitting/receiving data to and from the base station by the UE, and downlink (DL) means a scheme for transmitting/receiving data to/from the UE by the base station. Downlink may mean communication or communication path from the multiple transmission/transmission points to the UE, and uplink may mean communication or communication path from the UE to the multiple transmission/reception points. In this case, in the downlink, the transmitter may be part of the multiple transmission/reception points, and the receiver may be part of the UE. Further, in the uplink, the transmitter may be part of the UE, and the receiver may be part of the multiple transmission/reception points.

Uplink and downlink transmit/receive control information through a control channel, such as physical downlink control channel (PDCCH) or physical uplink control channel (PUCCH) and configure a data channel, such as physical downlink shared channel (PDSCH) or physical uplink shared channel (PUSCH), to transmit/receive data. Hereinafter, a context in which signals are transmitted/received through a channel, such as PUCCH, PUSCH, PDCCH, and PDSCH, is also referred to as 'transmits/receives PUCCH, PUSCH, PDCCH, and PDSCH.'

Although the technical spirit is described focusing primarily on the 3GPP LTE/LTE-A/new RAT (NR) communication system for clarity of description, the technical features are not limited to such communication system.

The 3GPP develops 5th-generation (5G) communication technology to meet the requirements of ITU-R's next-generation radio access technology after research on 4th-generation (4G) communication technology. Specifically, the 3GPP develops new NR communication technology separate from LTE-A pro and 4G communication technology, which have enhanced LTE-advanced technology to meet the requirements of ITU-R, as 5G communication technology. Both LTE-A pro and NR refer to 5G communication technologies. Hereinafter, 5G communication technology is described focusing on NR unless specified as a specific communication technology.

Operating scenarios in NR define various operating scenarios by adding considerations of satellites, automobiles, and new verticals in the existing 4G LTE scenarios and, from a service point of view, supports the enhanced mobile broadband (eMBB) scenario, the massive machine communication (mMTC) scenario that has high UE density but is deployed in a wide range to requires a low data rate and asynchronous access, and the ultra-reliability and low latency (URLLC) scenario that requires high responsiveness and reliability and may support high-speed mobility.

To meet such scenarios, NR discloses wireless communication systems that adopt a new waveform and frame structure technology, low-latency technology, ultra-high frequency band (mmWave) supporting technology, and forward compatibility providing technology. In particular, the NR system suggests various technical changes in terms of flexibility to provide forward compatibility. The main technical features of NR are described below with reference to the drawings.

<Overview of NR System>

FIG. 1 is a view schematically illustrating a structure for an NR system to which the present embodiments may apply.

Referring to FIG. 1, the NR system is divided into a 5G core network (5GC) and an NR-RAN part. The NG-RAN is constituted of gNB and ng-eNBs providing user plane (SDAP/PDCP/RLC/MAC/PHY) and user equipment (UE) control plane (RRC-Radio Resource Control) protocol termination. The gNBs or the gNBs and the ng-eNBs are interconnected through the Xn interface. The gNB and the ng-eNB are connected to the 5GC through the NG interface. The 5GC may include an access and mobility management function (AMF) which is in charge of the control plane, such as UE access and mobility control function, and a user plane function (UPF) which is in charge of the user data control function. NR supports both the below-6 GHz frequency band (Frequency Range 1 (FR1) and above-6 GHz frequency band (Frequency Range 2 (FR2)).

The gNB means a base station that provides the UE with NR user plane and control plane protocol termination, and the ng-eNB means a base station that provides the UE with the E-UTRA user plane and control plane protocol termination. In the disclosure, the base station should be understood as encompassing gNB and ng-eNB and, as necessary, be used to separately denote gNB or ng-eNB.

<NR Waveform, Numerology, and Frame Structure>

NR uses the CP-OFDM waveform using the cyclic prefix for downlink transmission and CP-OFDM or DFT-s-OFDM for uplink transmission. OFDM technology is easily combined with multiple input multiple output (MIMO) and has the advantages of high frequency efficiency and capability of using a low-complexity receiver.

Meanwhile, since, in NR, the above-described three scenarios have different requirements for data rate, latency, and coverage, it is needed to efficiently meet the requirements for each scenario through the frequency band constituting any NR system. To that end, there has been proposed technology for efficiently multiplexing radio resources based on a plurality of different numerologies.

Specifically, the NR transmission numerology is determined based on the subcarrier spacing and cyclic prefix (CP) and, as shown in Table 1 below, it is exponentially changed, with the exponent value of 2 used as u with respect to 15 kHz.

TABLE 1

| μ | subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
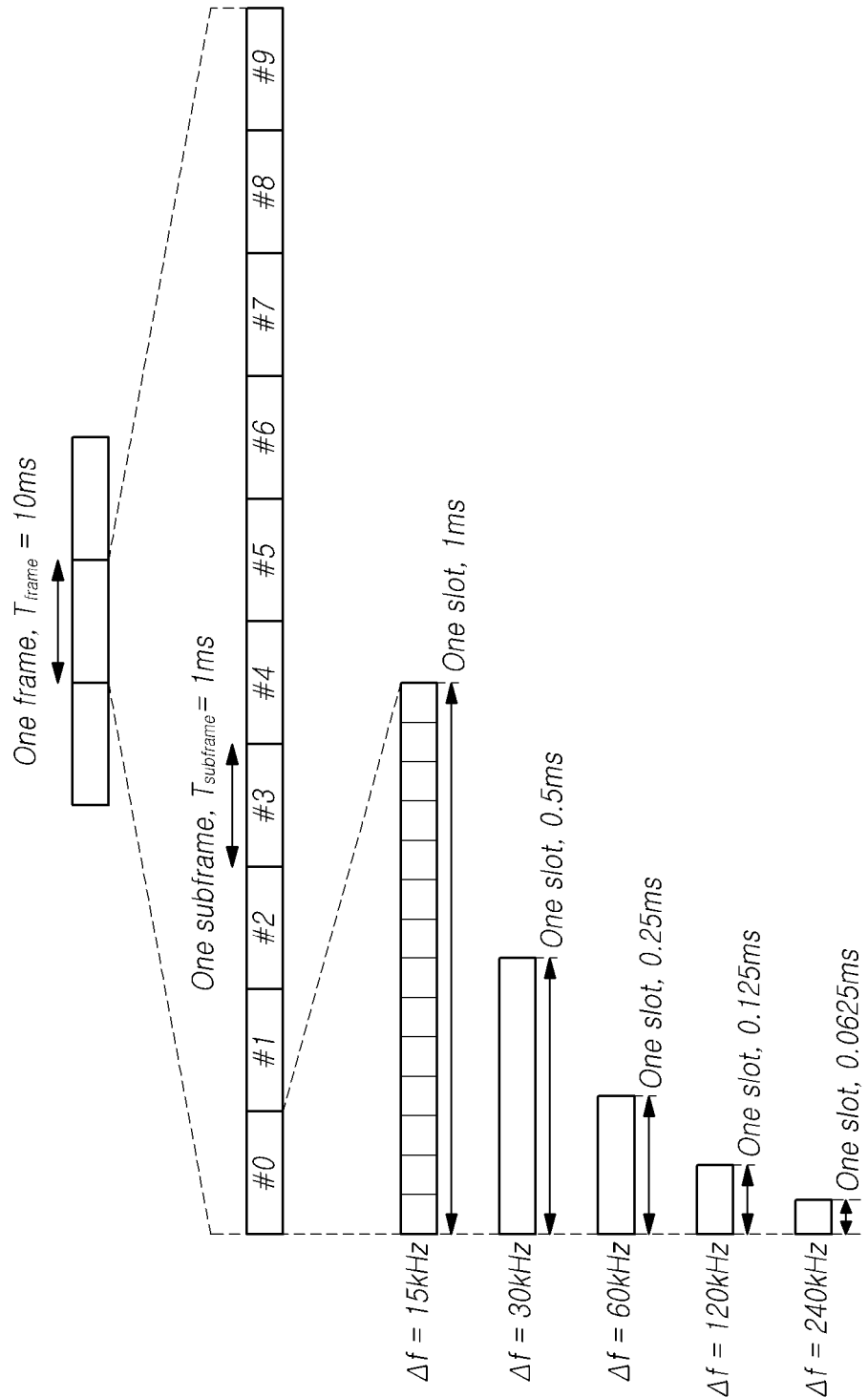
FIG. 2 is a view illustrating a frame structure in an NR system to which the present embodiments may apply.

As shown in Table 1 above, the NR numerologies may be divided into five types depending on the subcarrier spacing. This differs from the subcarrier spacing fixed to 15 kHz in LTE which is one 4G communication technology. Specifically, in NR, the subcarrier spacings used for data transmission are 15, 30, 60, and 120 kHz, and the subcarrier spacings used for synchronization signal transmission are 15, 30, 12, and 240 kHz. Further, the extended CP is applied only to the 60 kHz subcarrier spacing. Meanwhile, as the frame structure in NR, a frame having a length of 10 ms, which is constituted of 10 subframes having the same length of 1 ms, is defined. One frame may be divided into half frames of 5 ms, and each half frame may include 5 subframes. In the case of the 15 kHz subcarrier spacing, one subframe is constituted of one slot, and each slot is constituted of 14 OFDM symbols. FIG. 2 is a view illustrating a frame structure in an NR system to which the present embodiments may apply. Referring to FIG. 2, a slot is fixedly composed of 14 OFDM symbols in the case of the normal CP, but the length of the slot in the time domain may vary depending on the subcarrier spacing. For example, in the case of a numerology having a 15 kHz subcarrier spacing, a slot has the same length as the subframe, as the length of 1 ms. In contrast, in the case of a numerology having a 30 kHz subcarrier spacing, a slot is constituted of 14 OFDM symbols, but two slots may be included in one subframe, as the length of 0.5 ms. In other words, the subframe and the frame are defined as having a fixed length, and the slot is defined with the number of symbols, and the temporal length may vary depending on the subcarrier spacing.

Meanwhile, NR defined a slot as the basic unit for scheduling and, to reduce transmission latency in the radio section, adopted minislot (or subslot or non-slot based schedule). If a wide subcarrier spacing is used, the length of one slot is inverse-proportionally shortened, so that it is possible to reduce transmission latency in the radio section. The minislot is for efficient support of the URLLC scenario and enables scheduling in the units of 2, 4, or 7 symbols.

Further, NR defined uplink and downlink resource allocation as the symbol level in one slot, unlike LTE. To reduce HARQ latency, a slot structure has been defined which enables HARQ ACK/NACK to be transmitted directly in the transmission slot, and such slot structure is referred to as a self-contained structure in the description.

NR has been designed to be able to support a total of 256 slots and, among them, 62 slot formats are used in 3GPP Rel-15. Further, a common frame structure constituting the FDD or TDD frame is supported through a combination of various slots. For example, a slot structure in which the symbols of the slot all are configured as downlink, a slot structure in which all the symbols are configured as uplink, and a slot structure in which downlink symbols and uplink symbols are combined are supported. Further, NR supports data transmission that is distributed and scheduled in one or more slots. Therefore, the base station may inform the UE whether the slot is a downlink slot, uplink slot, or flexible slot using the slot format indicator (SFI). The base station may indicate the slot format by indicating the index of the table configured through UE-specific RRC (Radio Resource Control) signaling, by the SFI and may indicate it dynamically through downlink control information (DCI) or statically or semi-statically through RRC.

<NR Physical Resource>

In connection with the physical resource in NR, antenna port, resource grid, resource element, resource block, and bandwidth part are taken into consideration.

The antenna port is defined so that the channel carrying a symbol on the antenna port may be inferred from the channel carrying another symbol on the same antenna port. Where the large-scale property of the channel carrying a symbol on one antenna port may be inferred from the channel carrying a symbol on a different antenna port, the two antenna ports may be said to have a QC/QCL (quasi co-located or quasi co-location) relationship. Here, the large-scale properties include one or more of delay spread, Doppler spread, frequency shift, average received power, and received timing.

Figure 3:
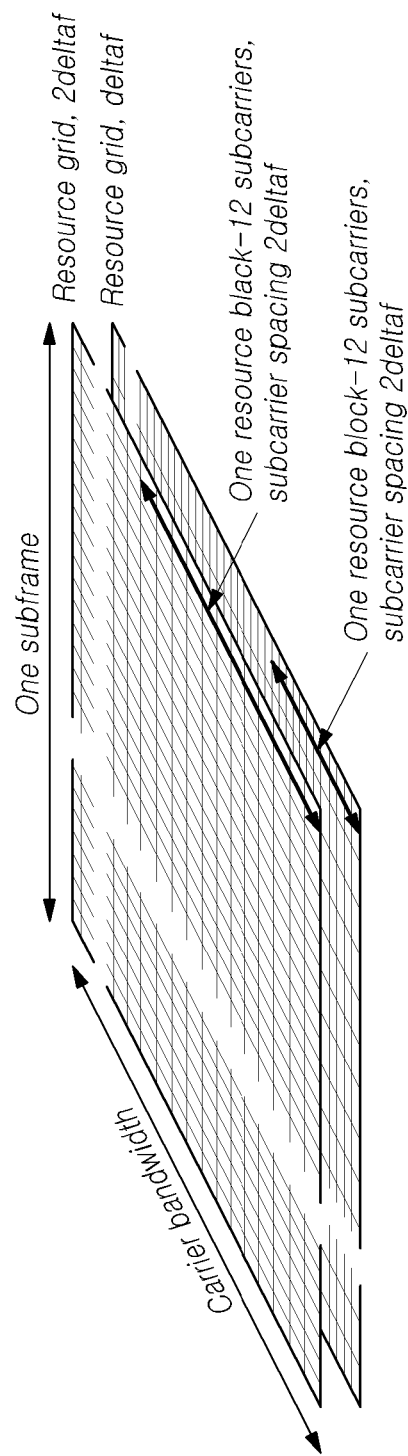
FIG. 3 is a view illustrating a resource grid supported by radio access technology to which the present embodiments may apply.

FIG. 3 is a view illustrating a resource grid supported by radio access technology to which the present embodiments may apply.

Referring to FIG. 3, since NR supports a plurality of numerologies in the same carrier, a resource grid may exist depending on each numerology. Further, the resource grid may exist depending on the antenna port, subcarrier spacing, or transmission direction.

The resource block is constituted of 12 subcarriers and is defined only in the frequency domain. Further, the resource element is constituted of one OFDM symbol and one subcarrier. Therefore, as shown in FIG. 3, the size of one resource block may vary depending on the subcarrier spacing. Further, in NR, "point A", which serves as a common reference point for the resource block grid, and common resource block and virtual resource block are defined.

Figure 4:
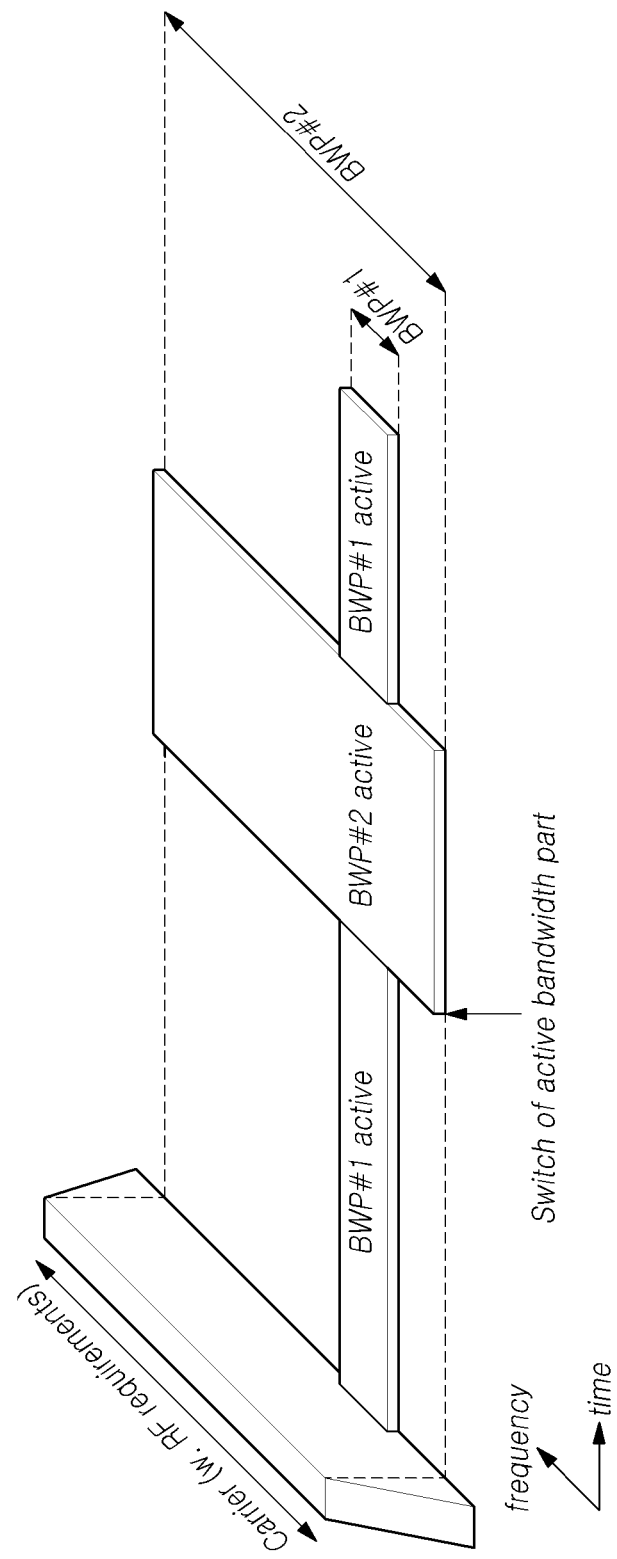
FIG. 4 is a view illustrating a bandwidth part supported by radio access technology to which the present embodiments may apply.

FIG. 4 is a view illustrating a bandwidth part supported by radio access technology to which the present embodiments may apply.

In NR, unlike LTE where the carrier bandwidth is fixed to 20 Mhz, the maximum carrier bandwidth from 50 Mhz to 400 Mhz is set for each subcarrier spacing. Therefore, it is not assumed that all UEs use all of these carrier bandwidths. Accordingly, in NR, as shown in FIG. 4, a bandwidth part (BWP) may be designated within the carrier bandwidth and used by the UE. Further, the bandwidth part is associated with one numerology and is composed of a subset of contiguous common resource blocks and may be activated dynamically over time. Up to four bandwidth parts may be configured in the UE for each of uplink and downlink. Data is transmitted/received using the bandwidth part activated at a given time.

In the case of paired spectra, the uplink and downlink bandwidth parts are set independently, and in the case of unpaired spectra, the bandwidth parts of uplink and downlink are set to make a pair to share the center frequency so as to prevent unnecessary frequency re-tunning between downlink and uplink operations.

<NR Initial Access>

In NR, the UE performs a cell search and random access procedure to access the base station and perform communication.

Cell search is a procedure in which the UE is synchronized with the cell of the base station using the synchronization signal block (SSB) transmitted from the base station, obtains the physical layer cell ID, and obtains system information.

Figure 5:
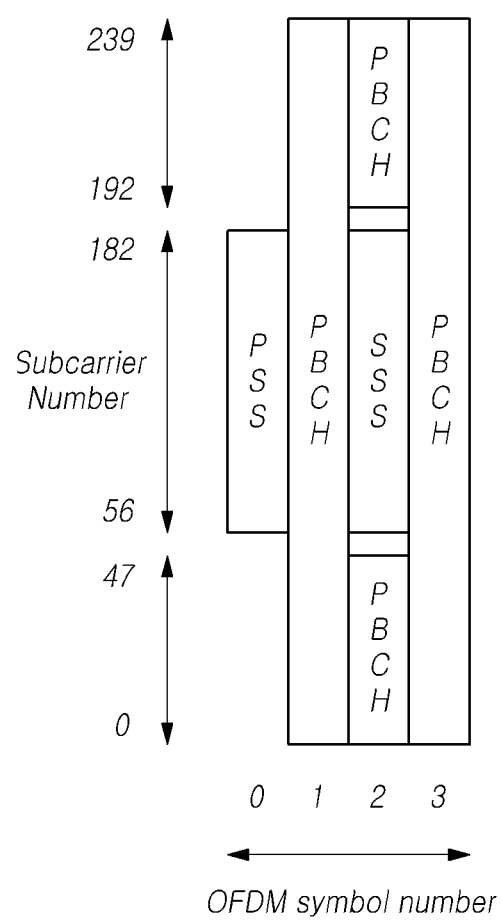
FIG. 5 is a view exemplarily illustrating a synchronization signal block in radio access technology to which the present embodiments may apply.

FIG. 5 is a view exemplarily illustrating a synchronization signal block in radio access technology to which the present embodiments may apply.

Referring to FIG. 5, the SSB is constituted of a primary synchronization signal (PSS) and a secondary synchronization signal (SSS) occupying 1 symbol and 127 subcarriers, respectively, and a PBCH spanning 3 OFDM symbols and 240 subcarriers.

The UE monitors the SSB in time and frequency domains and receives the SSB.

The SSB may be transmitted up to 64 times in 5 ms. Multiple SSBs are transmitted on different transmission beams within 5 ms time, and the UE performs detection assuming that SSBs are transmitted every 20 ms period based on one specific beam used for transmission. The number of beams available for SSB transmission within 5 ms may increase as the frequency band increases. For example, up to 4 SSB beams may be transmitted below 3 GHZ, SSBs may be transmitted using up to 8 different beams in a frequency band of 3 to 6 GHz, and up to 64 different beams in a frequency band of 6 GHz or higher.

Two SSBs are included in one slot, and the start symbol and number of repetitions within the slot are determined according to the subcarrier spacing as follows.

Meanwhile, the SSB is not transmitted at the center frequency of the carrier bandwidth unlike the SS of conventional LTE. In other words, the SSB may be transmitted even in a place other than the center of the system band and, in the case of supporting wideband operation, a plurality of SSBs may be transmitted in the frequency domain. Accordingly, the UE monitors the SSB by a synchronization raster, which is a candidate frequency location for monitoring the SSB. The carrier raster and synchronization raster, which are the center frequency location information about the channel for initial access, are newly defined in NR, and the synchronization raster has a wider frequency interval than the carrier raster, enabling the UE to do a fast SSB search.

The UE may obtain the MIB through the PBCH of the SSB. The master information block (MIB) includes minimum information for the UE to receive remaining system information (remaining minimum system information (RMSI) broadcast by the network. Further, the PBCH may include information about the position of the first DM-RS symbol in the time domain, information for monitoring SIB1 by the UE (e.g., SIB1 numerology information, information related to SIB1 CORESET, search space information, PDCCH-related parameter information, etc.), offset information between the common resource block and the SSB (the absolute location of the SSB within the carrier is transmitted through SIB1), and the like. Here, the SIB1 numerology information is equally applied to some messages used in the random access procedure for the UE to access the base station after completing the cell search procedure. For example, the numerology information about SIB1 may be applied to at least one of messages 1 to 4 for the random access procedure.

The above-described RMSI may mean system information block 1 (SIB1). SIB1 is broadcast periodically (e.g., 160 ms) in the cell. SIB1 includes information necessary for the UE to perform an initial random access procedure, and is periodically transmitted through the PDSCH. To receive SIB1, the UE needs to receive numerology information used for SIB1 transmission and control resource set (CORESET) information used for SIB1 scheduling through the PBCH. The UE identifies scheduling information for SIB1 using SI-RNTI in CORESET and obtains SIB1 on PDSCH according to scheduling information. The remaining SIBs except for SIB1 may be transmitted periodically and may be transmitted at the request of the UE.

Figure 6:
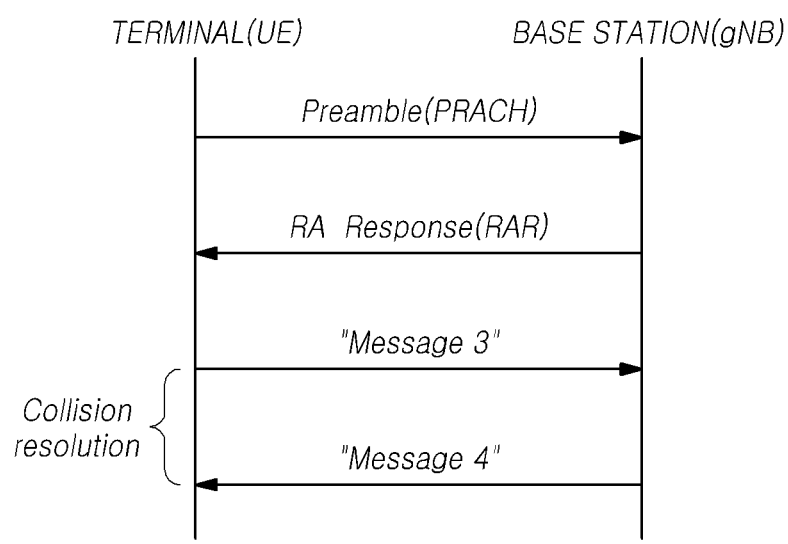
FIG. 6 is a view illustrating a random access procedure in radio access technology to which the present embodiments may apply.

FIG. 6 is a view illustrating a random access procedure in radio access technology to which the present embodiments may apply.

Referring to FIG. 6, if the cell search is completed, the UE transmits a random access preamble for random access to the base station. The random access preamble is transmitted through PRACH. Specifically, the random access preamble is transmitted to the base station through the PRACH composed of contiguous radio resources in a periodically repeated specific slot. In general, when the UE initially accesses the cell, a contention-based random access procedure is performed, and when random access is performed for beam failure recovery (BFR), a non-contention-based random access procedure is performed.

The UE receives a random access response to the transmitted random access preamble. The random access response may include a random access preamble identifier (ID), uplink radio resource (UL grant), temporary cell-radio network temporary identifier (C-RNTI), and time alignment command (TAC). Since one random access response may include random access response information for one or more UEs, the random access preamble identifier may be included to indicate to which UE the included UL grant, temporary C-RNTI, and TAC are valid. The random access preamble identifier may be an identifier for the random access preamble received by the base station. The TAC may be included as information for the UE to adjust uplink synchronization. The random access response may be indicated by the random access identifier on the PDCCH, that is, the random access-radio network temporary identifier (RA-RNTI).

Upon receiving a valid random access response, the UE processes information included in the random access response and performs scheduled transmissions to the base station. For example, the UE applies the TAC and stores the temporary C-RNTI. Further, the UE transmits data stored in the buffer of the UE or newly generated data to the base station using the UL grant. In this case, information that may identify the UE should be included.

Finally, the UE receives a downlink message for contention resolution.

<NR CORESET>

In NR, the downlink control channel is transmitted in a control resource set (CORESET) having a length of 1 to 3 symbols and transmits uplink/downlink scheduling information, slot format index (SFI), transmit power control (TPC) information, etc.

As such, NR introduced the concept of CORESET to secure the flexibility of the system. The control resource set (CORESET) means a time-frequency resource for a downlink control signal. The UE may use one or more search spaces in CORESET time-frequency resources to decode control channel candidates. A quasi co-location (QCL) assumption for each CORESET has been set, which is used for the purpose of indicating the characteristics of the analog beam direction in addition to the latency spread, Doppler spread, Doppler shift, and average latency, which are characteristics assumed by the conventional QCL.

Figure 7:
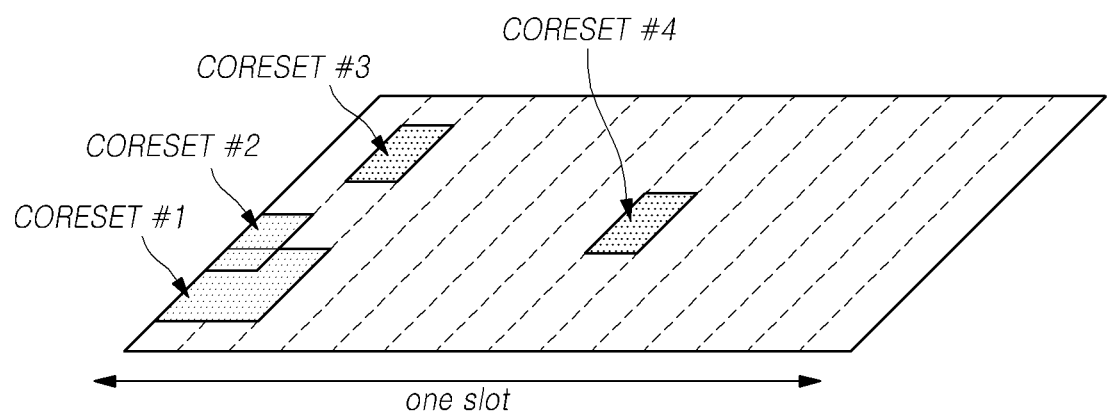
FIG. 7 is a view illustrating a CORESET.

FIG. 7 is a view illustrating a CORESET.

Referring to FIG. 7, the CORESET may exist in various forms within a carrier bandwidth within one slot. In the time domain, the CORESET may be constituted of up to 3 OFDM symbols. Further, the CORESET is defined as a multiple of 6 resource blocks up to the carrier bandwidth in the frequency domain.

The first CORESET is indicated through the MIB as part of the initial bandwidth part configuration to allow additional configuration and system information to be received from the network. After connection setup with the base station, the UE may receive and configure one or more CORESET information through RRC signaling.

As used herein, the frequency, frame, subframe, resource, resource block, region, band, subband, control channel, data channel, synchronization signal, various reference signals, various signals, and various messages related to new radio (NR) may be interpreted in various meanings as currently used or to be used in the future.

NR (New Radio)

NR recently conducted in the 3GPP has been designed to meet various QoS requirements required for each of further divided and specified service requirements (use scenarios) as well as an enhanced data rate as compared to LTE. In particular, as representative service requirements (usage scenarios) of NR, enhancement mobile broadband (eMBB), massive machine type communication (mMTC), and ultra-reliable and low latency communications (URLLC) have been defined and, as a method for meeting the requirements for each service requirement (usage scenario), a flexible frame structure as compared with LTE needs to be designed.

Each service requirement (usage scenario) has different requirements for data rates, latency, reliability, and coverage, and it has been designed to efficiently multiplex radio resource units based on different numerologies (e.g., subcarrier spacing, subframe, TTI, etc.) as a method for efficiently meeting the requirements for each service requirement (usage scenario) via the frequency band constituting any NR system.

As a method for the purpose, for the numerology which has different subcarrier spacing values, there are discussions about a method of multiplexing and supporting based on TDM, FDM, or TDM/FDM via one or more NR component carriers and a scheme for supporting one or more time units in configuring a scheduling unit in the time domain. In this regard, in NR, a definition for subframe, as a type of time domain structure, was made, and it has been determined to define a single subframe duration constituted of 14 OFDM symbols of 15 kHz subcarrier spacing (SCS)-based normal CP overhead, which is the same as that of LTE, as reference numerology for defining subframe duration. Accordingly, in NR, the subframe has 1 ms time duration. However, unlike LTE, the subframe of NR is absolute reference time duration and, as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Accordingly, any slot is constituted of 14 symbols. Further, depending on the transmission direction of the corresponding slot, all the symbols may be used for downlink (DL) transmission, for uplink (UL) transmission, or in the form of downlink (DL) portion+gap+uplink (UL) portion.

Further, a mini-slot is defined which is constituted of fewer symbols than the slot in any numerology (or SCS) and, based thereupon, a short time-domain scheduling interval for uplink/downlink data transmission/reception may be configured or a long time domain scheduling interval for uplink/downlink data transmission/reception may be configured through slot aggregation.

In particular, in the case of transmission/reception for latency-critical data, such as URLLC, if scheduling is performed in slot units which are based on 1 ms (14 symbols) which is defined in a frame structure which is based on numerology with a small SCS value such as 15 kHz, it may be difficult to meet the latency requirement. To that end, a mini-slot constituted of fewer OFDM symbols than the slot may thus be defined and, based thereupon, scheduling on latency-critical data such as URLLC may be performed.

Figure 8:
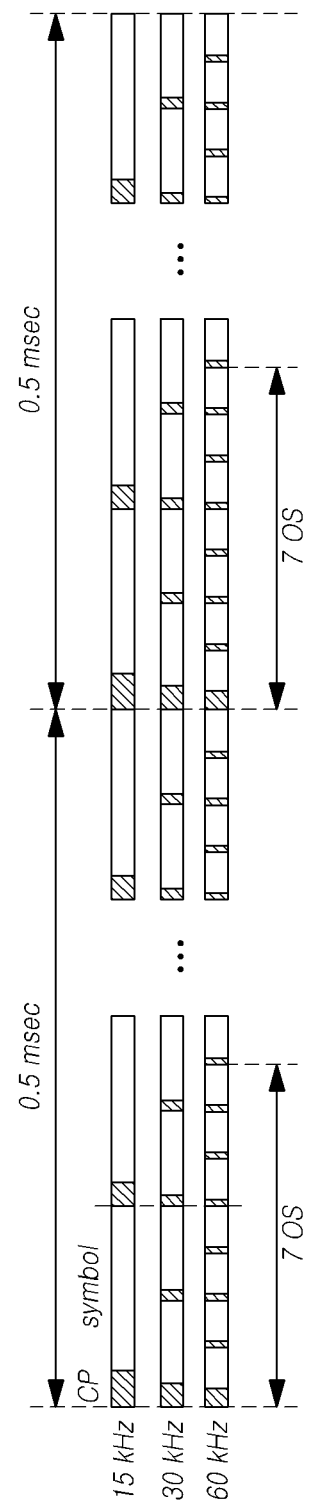
FIG. 8 is a view illustrating an example of a symbol level alignment in different subcarrier spacings (SCSs) to which the present embodiments may apply.

Or, as described above, there is also considered a scheme for scheduling data according to the latency requirement based on the slot (or mini-slot) length defined per numerology by multiplexing and supporting numerologies with different SCSs in TDM and/or FDM in one NR carrier. For example, as shown in FIG. 8, in the case where the SCS is 60 kHz, the symbol length is reduced by about ¼ as compared with when the SCS is 15 kHz. Thus, if one slot is made up of 14 OFDM symbols, the 15 kHz-based slot length is 1 ms whereas the 60 kHz-based slot length is reduced to about 0.25 ms.

As such, discussions are underway on methods for meeting the requirements of URLLC and eMBB by defining different SCSs or different TTI lengths in NR.

Wider Bandwidth Operations

Legacy LTE supports scalable bandwidth operation for any LTE component carrier (CC). In other words, according to the frequency deployment scenario, any LTE operator may configure a bandwidth from at least 1.4 MHz to at most 20 MHz in configuring one LTE CC, and the normal LTE UE supports transmission/reception capability of 20 MHz bandwidth for one LTE CC.

Figure 9:
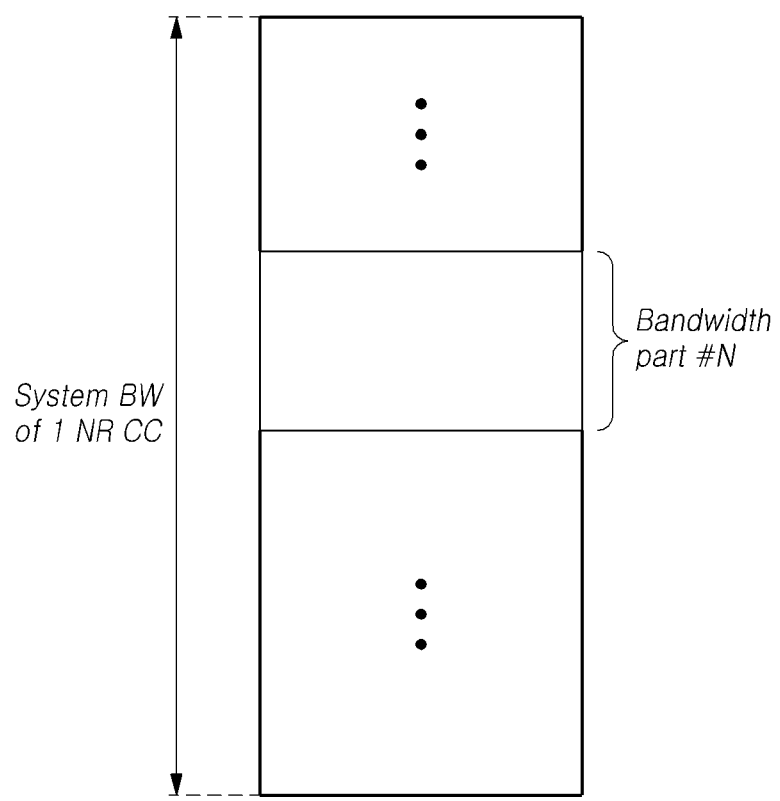
FIG. 9 is a view illustrating a conceptual example for a bandwidth part to which the present embodiments may apply.

However, NR is designed to be able to support NR UEs having different transmission/reception bandwidth capabilities through one wideband NR CC and is thus required to support flexible, wider bandwidth operations through activation and a different bandwidth part configuration per UE by configuring one or more bandwidth parts (BWPs) constituted of bandwidths subdivided for any NR CC as shown in FIG. 9.

Specifically, NR may configure one or more bandwidth parts through one serving cell configured in terms of UE, and the corresponding UE has been defined to activate one downlink (DL) bandwidth part and one uplink (UL) bandwidth part in the corresponding serving cell and use them for uplink/downlink data transmission/reception. Further, when a plurality of serving cells are configured in the corresponding UE, i.e., even CA-applied UEs have been defined to activate one downlink bandwidth part and/or uplink bandwidth part per serving cell and use them for uplink/downlink data transmission/reception using the radio resources of the corresponding serving cell.

Specifically, in any serving cell, an initial bandwidth part for initial access procedure of the UE is defined, one or more UE-specific bandwidth parts may be configured through dedicated RRC signaling for each UE, and a default bandwidth part for fallback operation may be defined for each UE.

However, it may be defined to activate and use a plurality of downlink and/or uplink bandwidth parts at the same time depending on the bandwidth part(s) and UE capability in any serving cell. However, in NR rel-15, it has been defined to activate and use only one downlink (DL) bandwidth part and uplink (UL) bandwidth part at any time in any UE.

It is scheduled to discuss positioning in frequency range (FR) 2 band which is a high frequency range, such as mmWave, in Rel-17. As compared with FR1 positioning, FR2 positioning has the features of use of multiple array antennas and a wide frequency band. By the features, an overhead issue may arise upon transmitting downlink (DL) positioning reference signal (PRS). In other words, signal overhead may sharply increase in an environment where positioning reference signals are periodically transmitted through a wide frequency band, and more base stations are dense in a predetermined area.

Thus, the disclosure proposes various beam sweeping schemes that may reduce overhead in FR2 positioning DL PRS transmission.

According to an example, a downlink PRS resource set may be introduced to facilitate positioning reference signal beam sweeping in FR2. Positioning at the mmWave frequency may be very effectively performed due to a large bandwidth (BW) that may be used for positioning reference signal transmission. However, the measurement overhead of FR2 may be very high. For example, the UE should measure eight cells and, when the positioning reference signal is transmitted in eight beams in each cell, the UE should measure up to 64 positioning reference signals.

Further, when the UE should perform reception (RX) beam sweeping in some cells, measurement of more positioning reference signals is needed. The UE may be configured to measure only subsets of PRS resources in one downlink PRS resource set. This may be possible when the UE or mobile communication network previously knows the beam that should be selected to measure the downlink positioning reference signal.

To that end, QCL information may be used in the neighbor cell as an example. However, the UE may not always have QCL information for all the cells to measure the positioning reference signal. Further, for example, the number of cells to be measured by the UE for DL-TDOA may be larger than the number of cells measured by the UE for mobility purposes. This means that an additional configuration is needed before the UE measures the downlink positioning reference signal or the UE does not have sufficient QCL information for all the cells to determine a correct downlink PRS beam to be measured. Therefore, a method for reducing the overhead of downlink PRS measurement is needed.

Meanwhile, in NR, downlink PRS resources are periodically transmitted by different transmit/receive points (TRPs). In FR2, each PRS resource may be configured of QCL-DRS (spatial Rx parameter) representing the transmit (Tx) beam. Accordingly, a fixed interference pattern between different DL PRS resources may be observed. Although PRS muting has been supported to change the interference between different DL PRS transmission situations, other mechanisms need to be considered to further enhance the DL PRS resource measurement quality.

According to an example, different Tx beams may be configured for different transmission occasions for each downlink PRS resource. In other words, by applying different Tx beams to different transmission occasions (i.e., beam sweeping), interference between two PRS resources of different TRPs may be randomized. Accordingly, it is possible to support beam sweeping between different transmission situations for the UL/DL PRS resources.

A method for reducing the overhead of positioning reference signal transmission is described below in detail with reference to related drawings.

Figure 10:
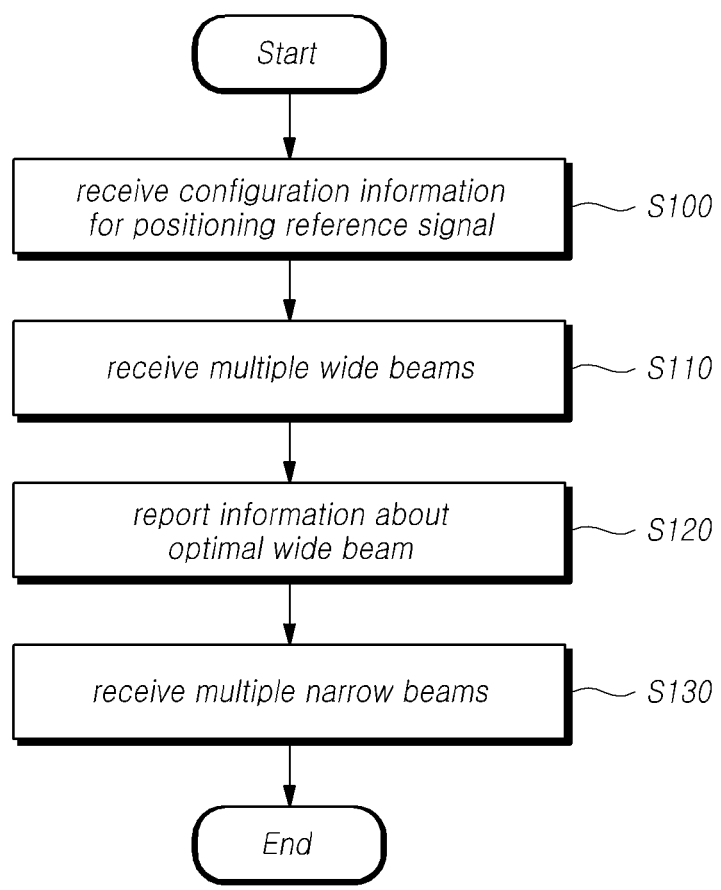
FIG. 10 is a view illustrating a procedure for reducing the overhead of positioning reference signal transmission by a UE according to an embodiment.

FIG. 10 is a view illustrating a procedure for reducing the overhead of positioning reference signal transmission by a UE according to an embodiment.

Referring to FIG. 10, the UE may receive configuration information for a positioning reference signal from the base station (S1000).

The PRS resource which is a radio resource used to transmit a positioning reference signal for positioning the UE may be flexibly configured to match various use scenarios of NR. That is, the positioning reference signal may be transmitted in various patterns on a radio resource according to use cases.

According to an example, the configuration information for the PRS resource may be received through higher layer signaling from the base station. In other words, parameters for configuring the PRS resource may be configured as higher layer parameters.

The configuration information for the PRS resource may include information about the PRS identifier, PRS sequence, frequency domain allocation information, time domain allocation information and comb size information for at least one PRS resource.

At least one or more PRS resources to be used for the base station to transmit a positioning reference signal may be configured. According to an example, at least one PRS resource may be configured of a PRS resource set. Further, at least one or more PRS resource sets used to transmit a positioning reference signal may be configured. In this case, each PRS resource and PRS resource set may be assigned identifiers (IDs) to identify each PRS resource and the PRS resource set. Further, the number of PRS resources included in each PRS resource set may also be included in the configuration information about the PRS resource.

Figure 12:
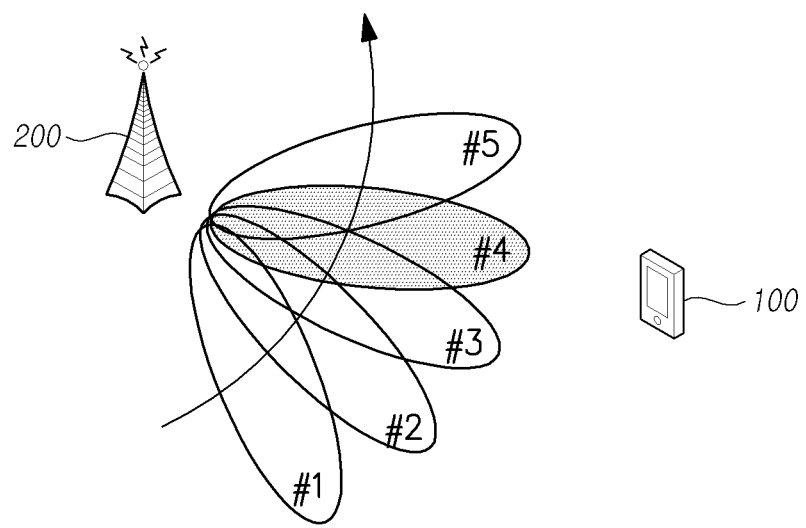
FIGS. 12 to 14 are views illustrating hierarchical beam sweeping-based downlink PRS transmission according to an embodiment.
Figure 13:
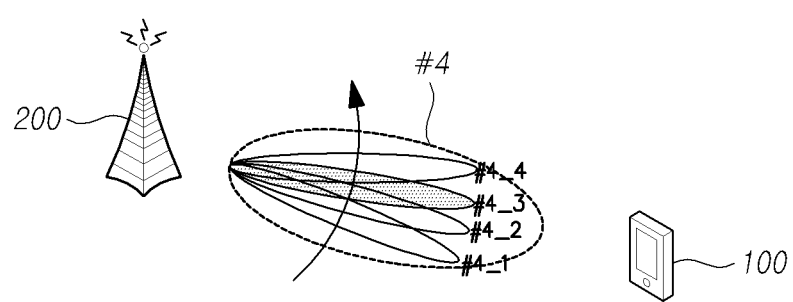

The PRS resources included in the PRS resource set may be implemented in a multiplexing scheme matching each beam. According to an example, the PRS resources in one PRS resource set may be configured to respectively correspond to wide beams #1 to #5 as shown in FIG. 12. Further, the PRS resources in another PRS resource set may be configured to respectively correspond to narrow beams #4_1 to #4_4 in any one wide beam #4 as shown in FIG. 13.

The configuration information for the PRS resource may include time domain allocation information for the PRS resource. The time domain allocation information may include the index of the symbol where the positioning reference signal starts in the PRS resource and information about the size of N contiguous symbols where the positioning reference signal is configured. To that end, offset information about the slot where the PRS resource starts with respect to the initial slot in the initial subframe with subframe number (SFN) 0 constituting one period of radio frame configured in the serving cell for the UE may be included in the configuration information. Further, information about the start symbol where the positioning reference signal starts to be transmitted in the slot where the PRS resource starts may be included in the configuration information.

Further, the positioning reference signal may be mapped to N contiguous symbols in one slot constituting the PRS resource. According to an example, N, which is the number of contiguous symbols, may be set to any one of 2, 4, 6, and 12. For example, when the start symbol is symbol 2 and N is set to 2, the positioning reference signal may be transmitted over symbols 2 and 3 in the corresponding slot.

The configuration information for the PRS resource may include frequency domain allocation information for the PRS resource. The frequency domain allocation information may include the index of the physical resource block (PRB) where the PRS resource starts in the system bandwidth configured for the UE and information about the number of resource blocks allocated to the PRS resource. To that end, offset information for the subcarrier where the PRS resource starts with respect to the subcarrier having the lowest index among the subcarriers constituting the frequency band allocated to reception of the positioning reference signal of the system bandwidth configured in the serving cell for the UE may be included in the configuration information.

Further, the configuration information for the PRS resource may include information about the comb size. The comb size information is pattern information about the frequency domain where the positioning reference signal is configured for the symbols in the PRS resource. According to an example, when 12 resource elements (REs) are allocated to transmission of a positioning reference signal for one slot, the comb size may be set to one of 2, 4, 6, and 12. For example, if the comb size is set to 2, a positioning reference signal may be configured one over two subcarriers for each symbol.

Referring back to FIG. 10, the UE may receive a plurality of wide beams through which the positioning reference signal is transmitted from the base station based on the configuration information (S1010).

The UE may receive the positioning reference signal through wide beams periodically transmitted from the base station, based on the configuration information for the positioning reference signal. In this case, the UE may sequentially receive a plurality of wide beams transmitted through beam sweeping by the base station.

According to an example, when the UE is in an RRC connected state, information about the optimal wide beam among the wide beams used for immediate positioning reference signal transmission may be in a state of having already been reported from the UE to the base station. In this case, the base station may sequentially transmit a plurality of wide beams through beam sweeping and may transmit the positioning reference signal using only a predetermined number of wide beams adjacent to the immediate optimal wide beam.

Referring back to FIG. 10, the UE may report information about the optimal wide beam determined among the plurality of wide beams to the base station (S1020).

The UE may receive the wide beams transmitted from the base station and determine the optimal wide beam among the plurality of received wide beams. In this case, according to an example, the UE may measure the reference signal received power (RSRP) value as the strength of the received signal and determine the wide beam having the maximum RSRP value as the optimal wide beam. However, this is an example, and embodiments of the disclosure are not limited thereto, and are not limited to a specific method if the UE may select a wide beam with the best efficiency to measure the positioning reference signal.

The UE may request narrow beam sweeping while reporting, e.g., base station ID, PRS index, and optimal beam index information.

Referring back to FIG. 10, the UE may receive a plurality of narrow beams through which the positioning reference signal is transmitted from the base station based on the optimal wide beam (S1030).

The UE may receive the positioning reference signal through the narrow beam transmitted by the base station according to the narrow beam sweeping request. In this case, narrow beams may be swept inly in the area of the optimal wide beam.

The UE may determine again the optimal narrow beam among the received narrow beams. Even in this case, the UE may determine the optimal narrow beam based on the RSRP value as described above. Accordingly, positioning reference signal transmission becomes possible through the optimal beam most appropriate in the current location of the UE, minimizing an error due to, e.g., offset, when measuring the location of the UE.

According to an example, the UE may receive a positioning reference signal from each of the serving cell and at least two or more neighboring cells. The UE may report the measured RSTD, RSRP or information about the time difference form transmission to reception to the base station. In this case, the UE may also report the PRS resource ID of the PRS resource where the positioning reference signal is received and the PRS resource set ID including the PRS resource.

The base station may estimate the crossing area based on the RSTD information. Thus, the UE's position may be estimated.

Accordingly, there may be provided a method and device for reducing the overhead of positioning reference signal transmission capable of addressing overhead issues that may be caused upon transmitting a positioning reference signal in a high frequency band or enhancing accuracy by transmitting a positioning reference signal through beam sweeping performed in two steps.

Operations of the base station, related to the above-described UE operations, are described below with reference to the drawings.

Figure 11:
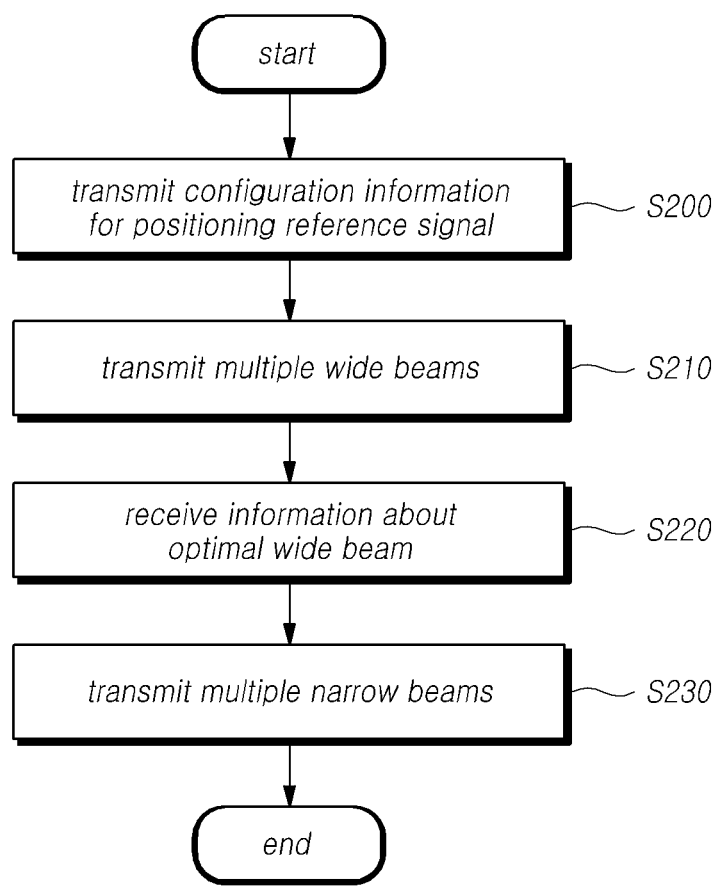
FIG. 11 is a view illustrating a procedure for reducing the overhead of positioning reference signal transmission by a base station according to an embodiment.

FIG. 11 is a view illustrating a procedure for reducing the overhead of positioning reference signal transmission by a base station according to an embodiment.

Referring to FIG. 11, the base station may transmit configuration information for the positioning reference signal to the UE (S1100).

The PRS resource which is a radio resource used to transmit a positioning reference signal for positioning the UE may be flexibly configured to match various use scenarios of NR. That is, the positioning reference signal may be transmitted in various patterns on a radio resource according to use cases.

According to an example, the base station may transmit the configuration information for the PRS resource through higher layer signaling. In other words, parameters for configuring the PRS resource may be configured as higher layer parameters.

The configuration information for the PRS resource may include information about the PRS identifier, PRS sequence, frequency domain allocation information, time domain allocation information and comb size information for at least one PRS resource.

At least one or more PRS resources to be used for the base station to transmit a positioning reference signal may be configured. According to an example, at least one PRS resource may be configured of a PRS resource set. Further, at least one or more PRS resource sets used to transmit a positioning reference signal may be configured. In this case, each PRS resource and PRS resource set may be assigned identifiers (IDs) to identify each PRS resource and the PRS resource set. Further, the number of PRS resources included in each PRS resource set may also be included in the configuration information about the PRS resource.

The PRS resources included in the PRS resource set may be implemented in a multiplexing scheme matching each beam. According to an example, the PRS resources in one PRS resource set may be configured to respectively correspond to wide beams #1 to #5 as shown in FIG. 12. Further, the PRS resources in another PRS resource set may be configured to respectively correspond to narrow beams #4_1 to #4_4 in any one wide beam #4 as shown in FIG. 13.

Referring back to FIG. 11, the base station may transmit a plurality of wide beams through which the positioning reference signal is transmitted to the UE based on the configuration information (S1110).

The base station may periodically transmit the positioning reference signal through wide beams based on the configuration information for the positioning reference signal. In this case, the UE may sequentially receive a plurality of wide beams transmitted through beam sweeping by the base station.

According to an example, when the UE is in an RRC connected state, information about the optimal wide beam among the wide beams used for immediate positioning reference signal transmission may be in a state of having already been reported from the UE to the base station. In this case, the base station may sequentially transmit a plurality of wide beams through beam sweeping and may transmit the positioning reference signal using only a predetermined number of wide beams adjacent to the immediate optimal wide beam.

Referring back to FIG. 11, the base station may receive information about the optimal wide beam determined among the plurality of wide beams from the UE (S1120).

The UE may receive the wide beams transmitted from the base station and determine the optimal wide beam among the plurality of received wide beams. In this case, according to an example, the UE may measure the reference signal received power (RSRP) value as the strength of the received signal and determine the wide beam having the maximum RSRP value as the optimal wide beam. However, this is an example, and embodiments of the disclosure are not limited thereto, and are not limited to a specific method if the UE may select a wide beam with the best efficiency to measure the positioning reference signal.

The base station may receive a request for narrow beam sweeping and, e.g., base station ID, PRS index, and optimal beam index information from the UE.

Referring back to FIG. 11, the base station may transmit a plurality of narrow beams where the positioning reference signal is transmitted to the UE based on the optimal wide beam.

The base station may transmit the positioning reference signal using the narrow beam according to the narrow beam sweeping request received from the UE. In this case, narrow beams may be swept inly in the area of the optimal wide beam.

The UE may determine again the optimal narrow beam among the received narrow beams. Even in this case, the UE may determine the optimal narrow beam based on the RSRP value as described above. Accordingly, positioning reference signal transmission becomes possible through the optimal beam most appropriate in the current location of the UE, minimizing an error due to, e.g., offset, when measuring the location of the UE.

According to an example, the UE may receive a positioning reference signal from each of the serving cell and at least two or more neighboring cells. The UE may report the measured RSTD, RSRP or information about the time difference form transmission to reception to the base station. In this case, the UE may also report the PRS resource ID of the PRS resource where the positioning reference signal is received and the PRS resource set ID including the PRS resource.

The base station may estimate the crossing area based on the RSTD information. Thus, the UE's position may be estimated.

Accordingly, there may be provided a method and device for reducing the overhead of positioning reference signal transmission capable of addressing overhead issues that may be caused upon transmitting a positioning reference signal in a high frequency band or enhancing accuracy by transmitting a positioning reference signal through beam sweeping performed in two steps.

Each embodiment related to the method for reducing the overhead of positioning reference signal transmission is described below in detail with reference to related drawings. The embodiments described below may be applied individually or in any combination thereof.

In the disclosure, an example of a beam sweeping-based PRS transmission protocol to reduce overhead in PRS transmission using beams in frequency range (FR) 2 which is a high frequency band is described.

As an example, when the UE receives positioning reference signals from eight base stations, each base station may transmit the positioning reference signal using eight beams. In this case, the UE receives a total of 64 positioning reference signals, so that an overhead issue may occur. To prevent such overhead, a new downlink PRS transmission protocol that transmits positioning reference signals using a hierarchical beam sweeping scheme is proposed.

In the disclosure, such operations as beam measurement and beam selection are described in NR-related operations, and thus, no detailed operation thereof is given. As the corresponding operations, various known methods may be used.

Hereinafter, operations are described separately for a UE in the idle state and a UE in the RRC connected state. However, the following description may be substantially equally applied to the UE in the RRC inactive state, unless contracting the technical spirit.

Figure 14:
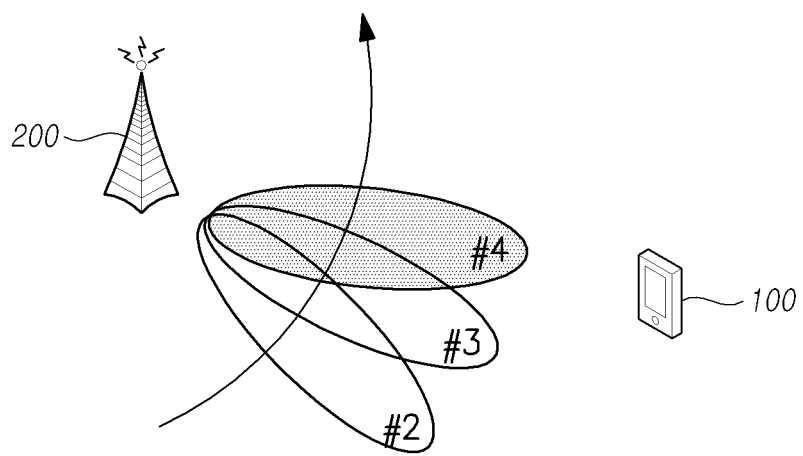

FIGS. 12 to 14 are views illustrating hierarchical beam sweeping-based downlink PRS transmission according to an embodiment.

According to an example, it is assumed that the UE is in an idle state. In this case, the UE may receive positioning reference signals by sequentially measuring beams in the order of a wide beam and a narrow beam.

Referring to FIG. 12, the base station 200 may periodically transmit positioning reference signals using wide beams #1 to #5. Although five wide beams are shown in FIG. 12, this is for convenience, and it is obvious that the number of wide beams is not limited thereto. In this case, the base station may sequentially transmit a plurality of wide beams through beam sweeping. The plurality of wide beams may be configured to respectively correspond to the PRS resources in the PRS resource set configured according to the configuration information for the positioning reference signal.

The UE may receive the wide beams transmitted from the base station and determine the optimal wide beam among the plurality of received wide beams. In this case, according to an example, the UE may measure the reference signal received power (RSRP) value as the strength of the received signal and determine the wide beam having the maximum RSRP value as the optimal wide beam. However, this is an example, and embodiments of the disclosure are not limited thereto, and are not limited to a specific method if the UE may select a wide beam with the best efficiency to measure the positioning reference signal.

Since the UE is in the idle state, the base station and the UE perform a random access procedure. In this case, the base station may allocate resources of the random access channel to the UE, and the UE may request narrow beam sweeping while feeding back base station ID, PRS index, and optimal beam index information.

For example, as shown in FIG. 12, wide beam #4 is assumed to be selected as the optimal beam. In this case, the base station may transmit the positioning reference signal using the narrow beam according to the received narrow beam sweeping request. In this case, as shown in FIG. 13, narrow beams #4_1 to #4_4 may be swept in the area of wide beam #4. Although four wide beams are shown in FIG. 13, this is an example, and it is obvious that the number of narrow beams is not limited thereto.

The UE may again determine an optimal narrow beam #4_3 from among narrow beams #4_1 to #4_4. Even in this case, the UE may determine the optimal narrow beam based on the RSRP value as described above. Accordingly, positioning reference signal transmission becomes possible through the optimal beam most appropriate in the current location of the UE, minimizing an error due to, e.g., offset, when measuring the location of the UE.

As described above, the UE may firstly select the optimal beam based on wide beams, transfer the selected result to the base station, and sweep beams only in the selected wide beam, rather than the entire area, when the base station secondarily transmits narrow beams, and transmit the positioning reference signal.

Accordingly, even when using narrow beams to transmit the positioning reference signal in an accuracy-enhanced or high frequency band, it is possible to prevent an increase in overhead due to unnecessary beam sweeping by performing beam sweeping only in the selected wide beam area.

According to another example, the UE is assumed to be in the RRC connected state. In this case, the UE may also receive positioning reference signals by sequentially measuring beams in the order of a wide beam and a narrow beam. However, since the UE is in the RRC connected state, information about the optimal wide beam among the wide beams used for immediate positioning reference signal transmission is in a state of having already been reported from the UE to the base station.

For example, it is assumed that the immediately prior optimum wide beam is #3. In this case, as shown in FIG. 14, the base station 200 may periodically transmit positioning reference signals using wide beams #2 to #4. In this case, the base station may sequentially transmit a plurality of wide beams through beam sweeping and may transmit the positioning reference signal using only a predetermined number of wide beams adjacent to the immediate optimal wide beam. In other words, unlike in the case of FIG. 12, the base station may transmit the positioning reference signal using fewer wide beams than those of the base station.

The UE may receive the wide beams transmitted from the base station and again determine the optimal wide beam among the plurality of received wide beams. In this case, according to an example, the UE may measure the RSRP value as the strength of the received signal and determine the wide beam having the maximum RSRP value as the optimal wide beam.

Further, the UE may request narrow beam sweeping while feeding back base station ID, PRS index, and optimal beam index information. In this case, since the UE is in the connected state, if not separately required, like in a handover situation, the random access procedure may be omitted.

For example, as shown in FIG. 14, wide beam #4 is assumed to be selected as the optimal beam. In this case, the base station may transmit the positioning reference signal using the narrow beam according to the received narrow beam sweeping request. In this case, as shown in FIG. 13, narrow beams #4_1 to #4_4 may be swept in the area of wide beam #4. Although four wide beams are shown in FIG. 13, this is an example, and it is obvious that the number of narrow beams is not limited thereto.

The UE may again determine an optimal narrow beam #4_3 from among narrow beams #4_1 to #4_4. Even in this case, the UE may determine the optimal narrow beam based on the RSRP value as described above. Accordingly, positioning reference signal transmission becomes possible through the optimal beam most appropriate in the current location of the UE, minimizing an error due to, e.g., offset, when measuring the location of the UE.

As described above, the UE may firstly select the optimal beam based on wide beams, transfer the selected result to the base station, and sweep beams only in the selected wide beam, rather than the entire area, when the base station secondarily transmits narrow beams, and transmit the positioning reference signal.

Accordingly, even when using narrow beams to transmit the positioning reference signal in an accuracy-enhanced or high frequency band, it is possible to prevent an increase in overhead due to unnecessary beam sweeping by performing beam sweeping only in the selected wide beam area.

According to an example, a beam group may be used for positioning reference signal transmission. In this case, a distinct PRS resource is mapped to each beam. Accordingly, the UE, receiving the positioning reference signal from the base station, may obtain beam directivity information.

As shown in FIG. 12, the base station transmits positioning reference signals sequentially in N different directions in a given time period. In other words, in the disclosure, beam sweeping to transmit the positioning reference signals means transmitting positioning reference signals in N directions.

For example, when N=5 as shown in FIG. 12, positioning reference signals are transmitted in five directions. In this case, according to an example, as shown in FIG. 13, narrow beams may be configured of a beam subset of corresponding wide beams and be configured to be transmitted in a group-type sector beam shape.

In this case, the positioning reference signals are sequentially transmitted on the time axis in the N beam directions. If the unit of positioning reference signal transmission is subframes, each positioning reference signal is transmitted in N subframes. If the unit of positioning reference signal transmission is slots, each positioning reference signal is transmitted in N slots. If the unit of positioning reference signal transmission is symbols, positioning reference signals are sequentially transmitted in N symbols. The transmission interval between wide beam and narrow beam may be set to be the same or different.

According to another example, for at least one of the wide beam or narrow beam, N beams may be transmitted simultaneously at a single time. In this case, beam sweeping to transmit positioning reference signals refers to transmitting positioning reference signals in N directions at the same time. In this case, the positioning reference signals may be multiplexed on the same time-frequency resource and transmitted or be mapped to N orthogonal PRS resources in the FDM form and transmitted.

Configurations of a UE and a base station which may perform all or some of the embodiments described above in connection with FIGS. 1 to 14 are described below with reference to the drawings. However, to avoid duplicate description, some of the above-described descriptions will be omitted.

Figure 15:
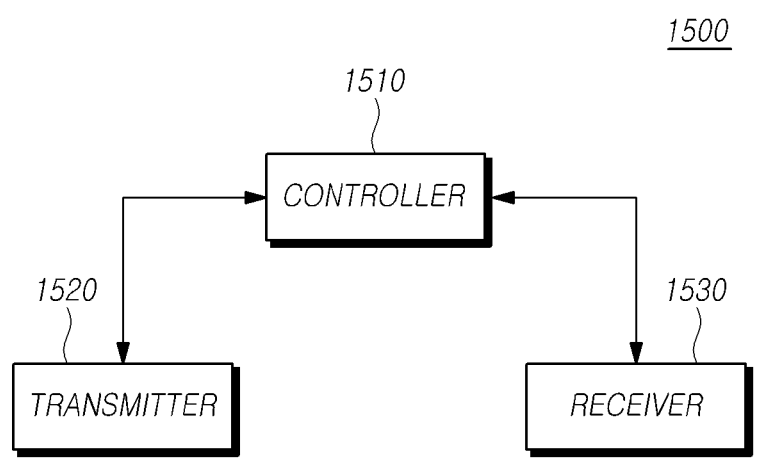
FIG. 15 is a view illustrating a configuration of a UE according to another embodiment.

FIG. 15 is a view illustrating a configuration of a UE 1500 according to an embodiment.

Referring to FIG. 15, according to another embodiment, a UE 1500 includes a controller 1510, a transmitter 1520, and a receiver 1530.

The controller 1510 controls the overall operation of the UE 1500 according to the method for reducing the overhead of positioning reference signal transmission required to perform the above-described disclosure. The transmitter 1520 transmits uplink control information and data or messages to the base station via a corresponding channel. The receiver 1530 receives downlink control information and data or messages from the base station via a corresponding channel.

The controller 1510 may control the receiver 1530 to receive configuration information for the positioning reference signal from the base station. The PRS resource which is a radio resource used to transmit a positioning reference signal for positioning the UE may be flexibly configured to match various use scenarios of NR. That is, the positioning reference signal may be transmitted in various patterns on a radio resource according to use cases.

According to an example, the configuration information for the PRS resource may be received through higher layer signaling from the base station. In other words, parameters for configuring the PRS resource may be configured as higher layer parameters.

The configuration information for the PRS resource may include information about the PRS identifier, PRS sequence, frequency domain allocation information, time domain allocation information and comb size information for at least one PRS resource.

At least one or more PRS resources to be used for the base station to transmit a positioning reference signal may be configured. According to an example, at least one PRS resource may be configured of a PRS resource set. Further, at least one or more PRS resource sets used to transmit a positioning reference signal may be configured. In this case, each PRS resource and PRS resource set may be assigned identifiers (IDs) to identify each PRS resource and the PRS resource set. Further, the number of PRS resources included in each PRS resource set may also be included in the configuration information about the PRS resource.

The PRS resources included in the PRS resource set may be implemented in a multiplexing scheme matching each beam. According to an example, the PRS resources in one PRS resource set may be configured to respectively correspond to wide beams #1 to #5 as shown in FIG. 12. Further, the PRS resources in another PRS resource set may be configured to respectively correspond to narrow beams #4_1 to #4_4 in any one wide beam #4 as shown in FIG. 13.

The controller 1510 may receive a plurality of wide beams through which the positioning reference signal is transmitted from the base station based on the configuration information. The controller 1510 may receive the positioning reference signal through wide beams periodically transmitted from the base station, based on the configuration information for the positioning reference signal. In this case, the UE may sequentially receive a plurality of wide beams transmitted through beam sweeping by the base station.

According to an example, when the UE is in an RRC connected state, information about the optimal wide beam among the wide beams used for immediate positioning reference signal transmission may be in a state of having already been reported from the UE to the base station. In this case, the base station may sequentially transmit a plurality of wide beams through beam sweeping and may transmit the positioning reference signal using only a predetermined number of wide beams adjacent to the immediate optimal wide beam.

The controller 1510 may control the transmitter 1520 to report information about the optimal wide beam determined among a plurality of wide beams to the base station. The controller 1510 may receive the wide beams transmitted from the base station and determine the optimal wide beam among the plurality of received wide beams. In this case, according to an example, the controller 1510 may measure the reference signal received power (RSRP) value as the strength of the received signal and determine the wide beam having the maximum RSRP value as the optimal wide beam.

The controller 1510 may request narrow beam sweeping while reporting, e.g., base station ID, PRS index, and optimal beam index information.

The controller 1510 may receive a plurality of narrow beams through which the positioning reference signal is transmitted from the base station based on the optimal wide beam. The base station may transmit the positioning reference signal using the narrow beam according to the narrow beam sweeping request received from the UE. In this case, narrow beams may be swept inly in the area of the optimal wide beam.

The controller 1510 may determine again the optimal narrow beam among the received narrow beams. Even in this case, the controller 1510 may determine the optimal narrow beam based on the RSRP value as described above. Accordingly, positioning reference signal transmission becomes possible through the optimal beam most appropriate in the current location of the UE, minimizing an error due to, e.g., offset, when measuring the location of the UE.

According to an example, the controller 1510 may receive a positioning reference signal from each of the serving cell and at least two or more neighboring cells. The controller 1510 may report the measured RSTD, RSRP or information about the time difference form transmission to reception to the base station. In this case, the controller 1510 may also report the PRS resource ID of the PRS resource where the positioning reference signal is received and the PRS resource set ID including the PRS resource.

The base station may estimate the crossing area based on the RSTD information. Thus, the UE's position may be estimated.

Accordingly, there may be provided a method and device for reducing the overhead of positioning reference signal transmission capable of addressing overhead issues that may be caused upon transmitting a positioning reference signal in a high frequency band or enhancing accuracy by transmitting a positioning reference signal through beam sweeping performed in two steps.

Figure 16:
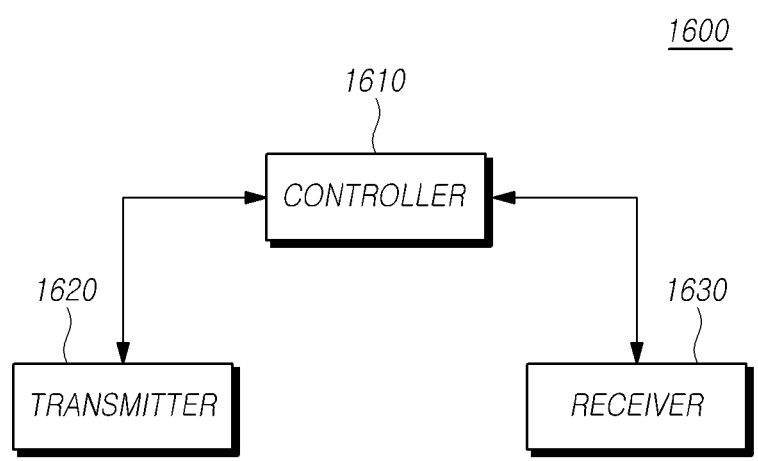
FIG. 16 is a view illustrating a configuration of a base station according to another embodiment.

FIG. 16 is a view illustrating a configuration of a base station 1600 according to an embodiment.

Referring to FIG. 16, according to another embodiment, a base station 1600 includes a controller 1610, a transmitter 1620, and a receiver 1630.

The controller 1610 controls the overall operation of the base station 1600 according to the method of performing frequency hopping needed to perform the above-described disclosure. The transmitter 1620 and the receiver 1630 are used to transmit or receive signals or messages or data necessary for performing the above-described disclosure, with the UE.

The controller 1610 may control the transmitter 1620 to transmit configuration information for the positioning reference signal to the UE. The PRS resource which is a radio resource used to transmit a positioning reference signal for positioning the UE may be flexibly configured to match various use scenarios of NR. That is, the positioning reference signal may be transmitted in various patterns on a radio resource according to use cases.

According to an example, the controller 1610 may transmit the configuration information for the PRS resource through higher layer signaling. In other words, parameters for configuring the PRS resource may be configured as higher layer parameters.

The configuration information for the PRS resource may include information about the PRS identifier, PRS sequence, frequency domain allocation information, time domain allocation information and comb size information for at least one PRS resource.

At least one or more PRS resources to be used for the base station to transmit a positioning reference signal may be configured. According to an example, at least one PRS resource may be configured of a PRS resource set. Further, at least one or more PRS resource sets used to transmit a positioning reference signal may be configured. In this case, each PRS resource and PRS resource set may be assigned identifiers (IDs) to identify each PRS resource and the PRS resource set. Further, the number of PRS resources included in each PRS resource set may also be included in the configuration information about the PRS resource.

The PRS resources included in the PRS resource set may be implemented in a multiplexing scheme matching each beam. According to an example, the PRS resources in one PRS resource set may be configured to respectively correspond to wide beams #1 to #5 as shown in FIG. 12. Further, the PRS resources in another PRS resource set may be configured to respectively correspond to narrow beams #4_1 to #4_4 in any one wide beam #4 as shown in FIG. 13.

The controller 1610 may transmit a plurality of wide beams through which the positioning reference signal is transmitted to the UE based on the configuration information. The controller 1610 may periodically transmit the positioning reference signal through wide beams based on the configuration information for the positioning reference signal. In this case, the UE may sequentially receive a plurality of wide beams transmitted through beam sweeping by the base station.

According to an example, when the UE is in an RRC connected state, information about the optimal wide beam among the wide beams used for immediate positioning reference signal transmission may be in a state of having already been reported from the UE to the base station. In this case, the controller 1610 may sequentially transmit a plurality of wide beams through beam sweeping and may transmit the positioning reference signal using only a predetermined number of wide beams adjacent to the immediate optimal wide beam.

The controller 1610 may control the receiver 1630 to receive information about the optimal wide beam determined among the plurality of wide beams from the UE. The UE may receive the wide beams transmitted from the base station and determine the optimal wide beam among the plurality of received wide beams. In this case, according to an example, the UE may measure the reference signal received power (RSRP) value as the strength of the received signal and determine the wide beam having the maximum RSRP value as the optimal wide beam.

The controller 1610 may receive a request for narrow beam sweeping and, e.g., base station ID, PRS index, and optimal beam index information from the UE.

The controller 1610 may transmit a plurality of narrow beams where the positioning reference signal is transmitted to the UE based on the optimal wide beam. The controller 1610 may transmit the positioning reference signal using the narrow beam according to the narrow beam sweeping request received from the UE. In this case, narrow beams may be swept inly in the area of the optimal wide beam.

The UE may determine again the optimal narrow beam among the received narrow beams. Even in this case, the UE may determine the optimal narrow beam based on the RSRP value as described above. Accordingly, positioning reference signal transmission becomes possible through the optimal beam most appropriate in the current location of the UE, minimizing an error due to, e.g., offset, when measuring the location of the UE.

According to an example, the UE may receive a positioning reference signal from each of the serving cell and at least two or more neighboring cells. The UE may report the measured RSTD, RSRP or information about the time difference form transmission to reception to the base station. In this case, the UE may also report the PRS resource ID of the PRS resource where the positioning reference signal is received and the PRS resource set ID including the PRS resource.

The controller 1610 may estimate the crossing area based on, e.g., the RSTD information. Thus, the UE's position may be estimated.

Accordingly, there may be provided a method and device for reducing the overhead of positioning reference signal transmission capable of addressing overhead issues that may be caused upon transmitting a positioning reference signal in a high frequency band or enhancing accuracy by transmitting a positioning reference signal through beam sweeping performed in two steps.

The above-described embodiments may be supported by the standard documents disclosed in IEEE 802, 3GPP, and 3GPP2 which are radio access systems. In other words, steps, components, and parts not described to clarify the technical spirit in the embodiments may be supported by the above-described standard documents. Further, all the terms disclosed in the disclosure may be described by the standard documents disclosed above.

The present embodiments described above may be implemented through various means. For example, the present embodiments may be implemented by various means, e.g., hardware, firmware, software, or a combination thereof.

When implemented in hardware, the method according to the present embodiments may be implemented by, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, the method according to the present embodiments may be implemented in the form of a device, procedure, or function performing the above-described functions or operations. The software code may be stored in a memory unit and driven by a processor. The memory unit may be positioned inside or outside the processor to exchange data with the processor by various known means.

The above-described terms, such as "system," "processor," "controller," "component," "module," "interface," "model," or "unit," described above may generally refer to computer-related entity hardware, a combination of hardware and software, software, or software being executed. For example, the above-described components may be, but are not limited to, processes driven by a processor, processors, controllers, control processors, entities, execution threads, programs, and/or computers. For example, both an application being executed by a controller or a processor and the controller or the processor may be the components. One or more components may reside within a process and/or thread of execution, and the components may be positioned in one device (e.g., a system, a computing device, etc.) or distributed in two or more devices.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. A method for reducing overhead of positioning reference signal (PRS) transmission by a user equipment (UE), the method comprising:
    receiving configuration information for a positioning reference signal from a base station;
    receiving a plurality of wide beams where the positioning reference signal is transmitted from the base station, based on the configuration information;
    reporting information about an optimal wide beam determined among the plurality of wide beams to the base station; and
    receiving a plurality of narrow beams where the positioning reference signal is transmitted from the base station, based on the optimal wide beam,
    wherein the plurality of wide beams and the plurality of narrow beams each correspond to a different positioning reference signal resource set.

2. The method of claim 1, wherein receiving the plurality of wide beams includes receiving a plurality of wide beams including a predetermined number of wide beams adjacent to an optimal wide beam received immediately before, when the UE is in a radio resource control (RRC) connected state.

3. The method of claim 1, wherein the plurality of wide beams are sequentially received.

4. The method of claim 1, wherein the plurality of narrow beams are sequentially received in a range of the optimal wide beam.

5. A method for reducing overhead of positioning reference signal (PRS) transmission by a base station, the method comprising:
    transmitting configuration information for a positioning reference signal to a user equipment (UE);
    transmitting a plurality of wide beams where the positioning reference signal is transmitted to the UE, based on the configuration information;
    receiving information about an optimal wide beam determined among the plurality of wide beams from the UE; and
    transmitting a plurality of narrow beams where the positioning reference signal is transmitted to the UE, based on the optimal wide beam,
    wherein the plurality of wide beams and the plurality of narrow beams each correspond to a different positioning reference signal resource set.

6. The method of claim 5, wherein transmitting the plurality of wide beams includes transmitting a plurality of wide beams including a predetermined number of wide beams adjacent to an optimal wide beam transmitted immediately before, when the UE is in a radio resource control (RRC) connected state.

7. The method of claim 5, wherein the plurality of narrow beams are sequentially transmitted in a range of the optimal wide beam.

8. The method of claim 5, wherein the plurality of wide beams are sequentially transmitted.

9. A user equipment (UE) for reducing overhead of positioning reference signal (PRS) transmission, comprising:
    a transmitter;
    a receiver; and
    a controller controlling the transmitter and the receiver, wherein the controller:
    receives configuration information for a positioning reference signal from a base station;
    receives a plurality of wide beams where the positioning reference signal is transmitted from the base station, based on the configuration information;
    reports information about an optimal wide beam determined among the plurality of wide beams to the base station; and
    receives a plurality of narrow beams where the positioning reference signal is transmitted from the base station, based on the optimal wide beam,
    wherein the plurality of wide beams and the plurality of narrow beams each correspond to a different positioning reference signal resource set.

10. The UE of claim 9, wherein the plurality of wide beams are sequentially received.

11. The UE of claim 9, wherein the plurality of narrow beams are sequentially received in a range of the optimal wide beam.

12. The UE of claim 9, wherein the controller receives a plurality of wide beams including a predetermined number of wide beams adjacent to an optimal wide beam received immediately before, when the UE is in a radio resource control (RRC) connected state.

* * * * *